April 14, 1959 G. A. LYON 2,882,096
WHEEL COVER
Filed Sept. 25, 1956 2 Sheets-Sheet 1
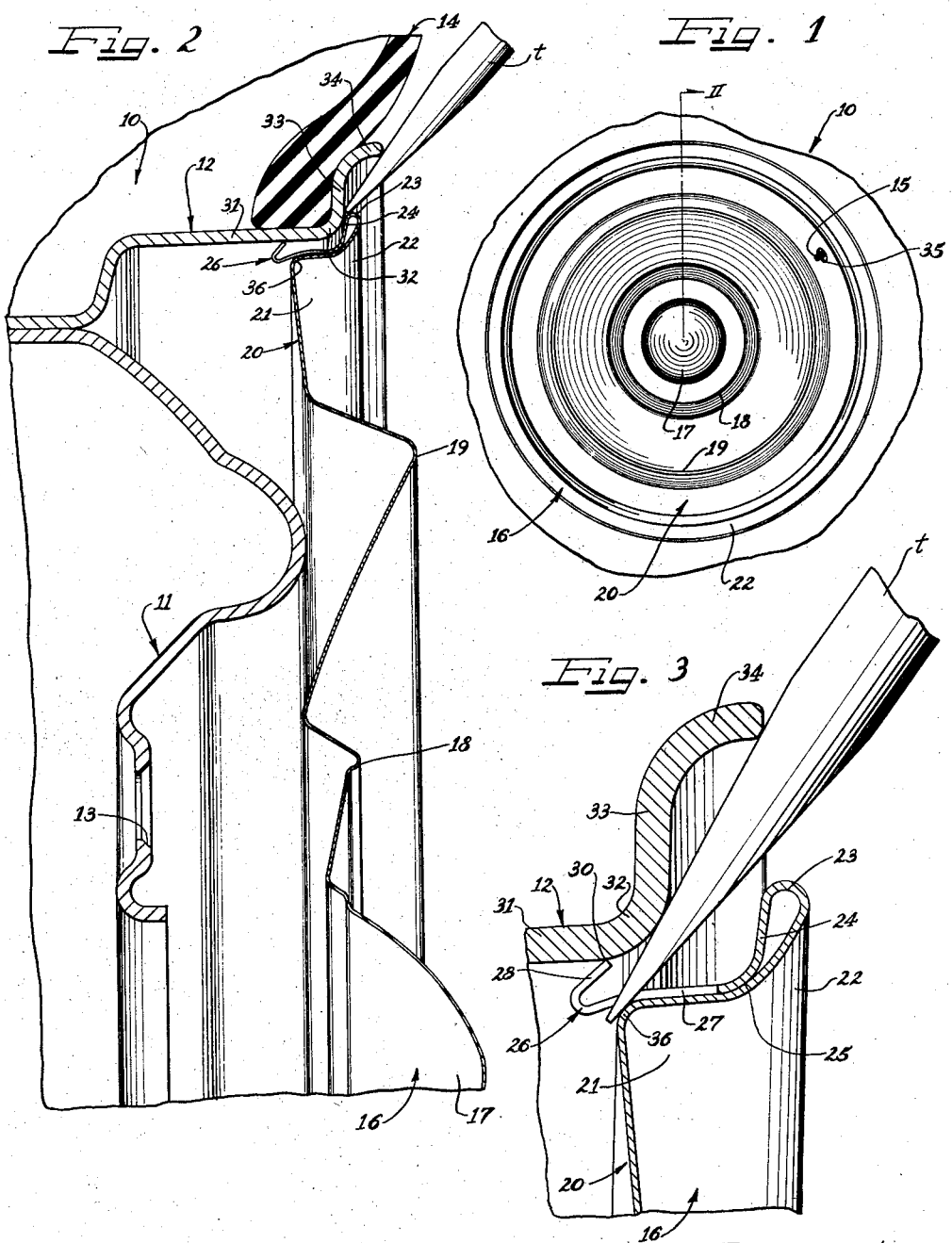
Inventor
George Albert Lyon
By Hill, Sherman, Meroni, Gross + Simpson Attys

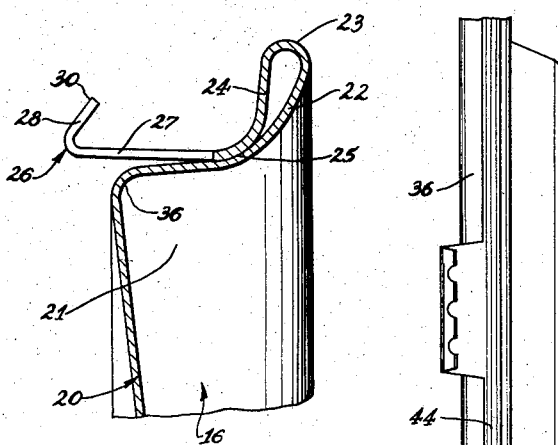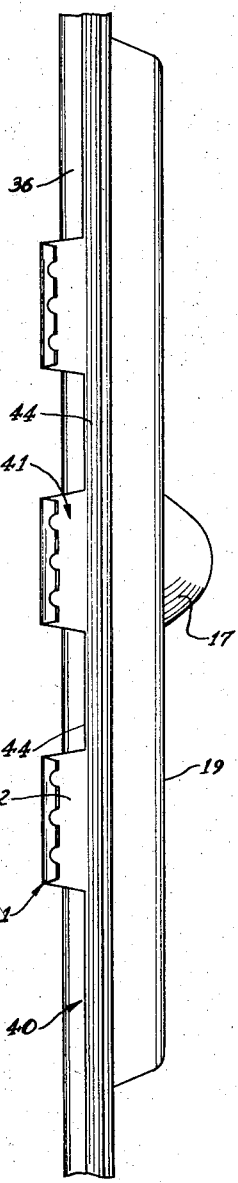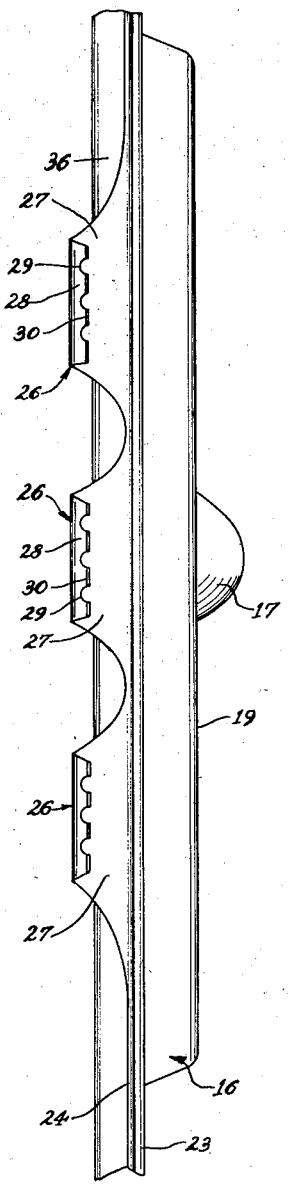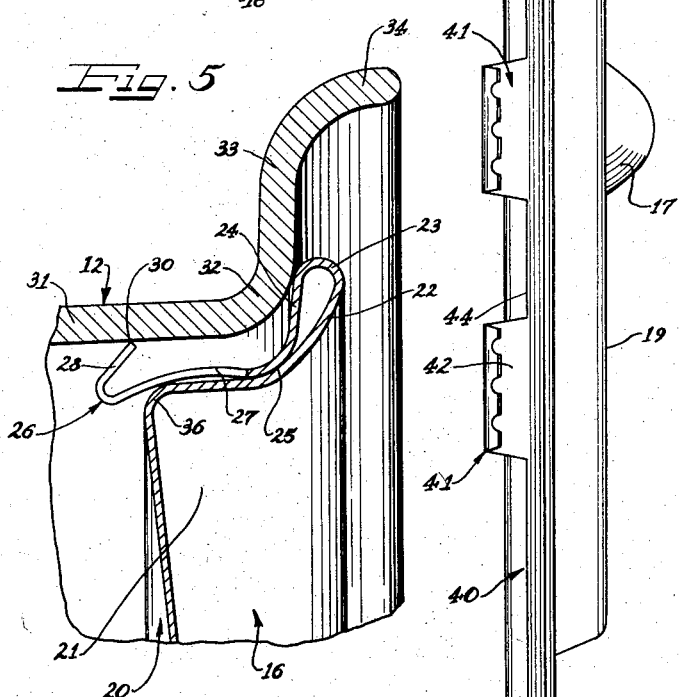

United States Patent Office 2,882,096
Patented Apr. 14, 1959

2,882,096

WHEEL COVER

George Albert Lyon, Detroit, Mich.

Application September 25, 1956, Serial No. 611,858

9 Claims. (Cl. 301—37)

This invention relates generally to a wheel structure and more particularly to an ornamental wheel cover member for protective retained disposition upon a vehicle wheel.

More specifically, this invention relates to a cover having new and improved means for detachably retaining itself upon a vehicle wheel and which means is capable of biting very hard into the surface to which it is applied.

Accordingly, an object of this invention is to provide a new and improved wheel cover member having retaining means with improved cover retaining or gripping characteristics.

Still another object of this invention is to provide a new and improved wheel cover member which lends itself to being readily attached and removed from a vehicle wheel without damaging the cover.

A further object of this invention relates to a new and improved wheel cover member for protecting the outer side of a vehicle wheel and for highlighting the over-all appearance of the wheel.

According to the general features of this invention there is provided in a wheel structure a wheel having an axial surface, a wheel cover member for overlying engagement on the wheel including a nose portion, the cover having a margin with an annular underturned portion underlying the margin, and circumferentially spaced retaining fingers connected to the underturned portion and opposite the nose including an elongated axial leg and terminating in a short stiff return bent terminal leg having an edge for edgewise biting cooperation with the axial surface, the axial leg when pressed against the wheel being fulcrumed and bowed on the nose portion with the terminal leg engaging the axial surface and maintaining the axial leg bowed and biased on the nose portion.

Other objects and features of this invention will more fully become apparent in view of the following detailed description taken in connection with the accompanying sheets of drawings illustrating therein several embodiments and in which:

Figure 1 is an enlarged fragmentary side elevation of my wheel structure;

Figure 2 is an enlarged fragmentary cross-sectional view taken substantially on the line II—II of Figure 1, looking in the direction indicated by the arrow;

Figure 3 is an enlarged fragmentary cross-sectional view similar to Figure 2 only blown up and showing how the cover may be removed from the wheel;

Figure 4 is an enlarged fragmentary cross-sectional view similar to Figure 3 only showing a portion of the cover by itself;

Figure 5 is an enlarged fragmentary cross-sectional view of a portion of the structure shown in Figure 2;

Figure 6 is an enlarged fragmentary edge elevation of the structure shown in Figures 1-5; and Figure 7 is an enlarged fragmentary edge elevation similar to Figure 6 only illustrating a modified form of my invention.

As shown on the drawings:

The reference numeral 10 indicates generally my wheel structure and includes a body part 11 which is connected to a multi-flanged drop center type of tire rim 12. The wheel structure 10 is adapted to be connected to an axle of an automobile vehicle by means of inserting lugs on the axle through openings 13 in the body part and thereafter threading nuts onto the lugs to clamp the body part 11 to the axle.

Carried on the tire rim 12 is a conventional tire assembly 14 which is here shown as a tubeless type and which is adapted to be inflated by inserting air into valve stem 15 shown in Figure 1.

In overlying disposition upon the wheel is my wheel cover 16 which may be made from any suitable material with excellent results being attained through making the wheel cover of stainless spring steel. The cover includes a relatively small convex crown portion 17 which is bounded at its periphery by consecutive peaked ribs 18 and 19 and with a dished cover portion 20 radially outwardly of the peaks 18 and 19. The dished cover portion 20 has one side or flange merged with the peaked portion 19 and another outer side or flange 21 connected to the cover margin 22.

The cover margin 22 is turned under at 23 to provide an annular underlying cover portion 24 which is bottomed at 25 (Figure 3) along the inner surface of the cover generally at the junction of the dished portion 20 with the cover margin 22.

In the first embodiment shown, the underturned flange 24 extends not only in a radial direction but generally axially along the inner surface of the dished portion 20.

Disposed at the inner end of the turned under flange 24 are circumferentially spaced retaining extensions 26 which are preferably arranged in a common circle and in four sets or groups of retaining extensions with preferably three extensions in each group with each extension in a given set of extensions separated from adjacent extensions in the same set by notches. It will be appreciated the sets of extensions may be formed from the cover material at the four corners of a cover blank to keep cost to a minimum.

Each retaining extension includes an elongated wedge-shaped axial leg 27 which extends normally at an angle inclined radially and axially away from the axial cover portion 21 (Figure 4). Disposed at the axially inner end of the elongated resilient finger or leg portion 27 is a return bent short stiff terminal leg 28. The leg 28 is notched at 29 (Figure 6) to provide a series of edges 30 for edgewise engagement with the tire rim. More specifically, the retaining extensions 26 are adapted to cooperate with an axially extending intermediate rim flange 31 which rim flange is junctioned at 32 to radial rim flange 33 which is in turn connected at its outer end to terminal rim flange 34.

To apply the cover to the wheel, the valve stem 15 is initially aligned with respect to cover opening 35 (Figure 1) and upon the application of an axially inward force the finger edges 30 are caused to flex along the intermediate rim flange 31 into biting cover retaining engagement therewith. When the cover is in full assembly upon the wheel, the turned under portion 24 is bottomed against rim junction 32 to provide a backup for the engagement of the fingers and more specifically the finger edges 30 with the intermediate tire rim flange 31.

As the finger is biased along the slightly inclined intermediate flange 31, the elongated axial finger leg 27 is fulcrumed against annular shoulder or nose portion 36 disposed on the axially inner side of the cover and more particularly is defined by the intersection of segments of the dished portion 20. The nose portion 36 is disposed generally radially opposite the gripping edge 30 of the finger so that when the leg 27 is engaged against the nose portion, the leg 27 is backed up at an area in close proximity to the underturned gripping edge 30. Hence, when the cover is in full assembly upon the wheel, the intermediate axial leg 27 is bowed over the nose portion 36 and assumes a generally arcuate cross-sectional shape. By this construction, the edge 30 has a backup in close proximity thereto, thereby augmenting the gripping capacity of the finger extensions 26. Also, the edge 30 may in this manner be caused to bite very hard into the rim flange in comparison to former constructions.

The cover 16 may be removed from the wheel by inserting a pry-off tool underneath cover portion 23 and fulcrumed against rim flange 34. By exerting an axial force the tool may be worked underneath the cover and between the finger extensions 26 in a given set of extensions until the edges 30 are disengaged from the wheel.

In Figure 7 is shown a modified form of my invention which may be assembled and removed from the wheel in the same manner as in the first form of my invention. In this instance the cover 40 has grouped retaining extensions 41 similar to the extensions 26 only the axial leg 42 is not as wide at its junction with the cover than in the first form of my invention. To compensate for this, axial flange 42 is made wider than the axial flange 24 in Figures 1–6. In addition, the cover has a square type notch 44 between the extensions 41 as opposed to the first form of my invention.

It will be understood that modifications and variations may be effected without departing from the scope of the novel concepts of the present invention.

I claim as my invention:

1. In a wheel structure, a wheel having an axial surface, a wheel cover member for overlying engagement on the wheel including a nose portion, said cover having a margin with an annular underturned portion underlying the margin, and circumferentially spaced resiliently deflectable retaining fingers connected to the underturned portion and opposite the nose including an elonagted resiliently deflectable axial leg and terminating in a short stiff return bent terminal leg having an edge for edgewise biting cooperation with the axial surface, said resiliently deflectable axial leg when removed from the wheel being spaced from said nose portion and when pressed against the wheel said axial leg being fulcrumed and bowed on said nose portion with the terminal leg engaging the axial surface and maintaining the axial leg bowed and biased on the nose portion.

2. In a wheel structure a wheel having an axial surface, a wheel cover member for overlying engagement on the wheel including a nose portion, and circumferentially spaced resiliently deflectable retaining fingers opposite the nose including an elongated resiliently deflectable axial leg and terminating in a short stiff return bent terminal leg having an edge for edgewise biting cooperation with the axial surface, said resiliently deflectable axial leg when removed from the wheel being spaced from said nose portion and when pressed against the wheel said axial leg being fulcrumed and bowed on said nose portion with the terminal leg engaging the axial surface and maintaining the axial leg bowed and biased on the nose portion.

3. In a wheel structure a wheel having an axial surface, a wheel cover member for overlying engagement on the wheel including a nose portion, and circumferentially spaced resiliently deflectable retaining fingers opposite the nose including an elongated resiliently deflectable axial leg and terminating in a short stiff return bent terminal leg having an edge for edgewise biting cooperation with the axial surface, said resiliently deflectable axial leg when pressed against the wheel being fulcrumed and bowed on said nose portion with the terminal leg engaging the axial surface and maintaining the axial leg bowed and biased on the nose portion, said nose portion being bounded at one side by an axial cover flange and with said underturned portion bottomed thereagainst and said elongated axial leg being normally inclined radially away from said axial cover flange when the cover is removed from the wheel.

4. In a wheel structure, a wheel having an axial surface, a wheel cover member for overlying engagement on the wheel including a nose portion, and circumferentially spaced resiliently deflectable retaining fingers opposite the nose including an elongated resiliently deflectable axial leg and terminating in a short stiff return bent terminal leg having an edge for edgewise biting cooperation with the axial surface, said resiliently deflectable axial leg when removed from the wheel being spaced from said nose portion and when pressed against the wheel said axial leg being fulcrumed and bowed on said nose portion with the terminal leg engaging the axial surface and maintaining the axial leg bowed and biased on the nose portion, said retaining fingers being arranged in a common circle and being arranged in sets with each extension being separated from adjacent retaining fingers by notches.

5. In a wheel structure, a wheel having an axial surface, a wheel cover member for overlying engagement on the wheel including a nose portion, said cover having a margin with an annular underturned portion underlying the margin, and circumferentially spaced resiliently deflectable retaining fingers connected to the underturned portion and opposite the nose including an elongated resiliently deflectable axial leg and terminating in a short stiff return bent terminal leg having an edge for edgewise biting cooperation with the axial surface, said resiliently deflectable axial leg when removed from the wheel being spaced from said nose portion and when pressed against the wheel said axial leg being fulcrumed and bowed on said nose portion with the terminal leg engaging the axial surface and maintaining the axial leg bowed and biased on the nose portion, each terminal leg having a series of notches at its free end and providing a series of gripping edges.

6. In a wheel structure, a wheel, a wheel cover segment for overlying retained engagement on the wheel including shoulder structure, said cover having an outer margin with an underturned portion underlying the margin, and circumferentially spaced resiliently deflectable retaining fingers connected to the underturned portion including an elongated resiliently deflectable axial leg bottomed against the cover segment at its axially outer end and terminating in a short stiff return bent terminal leg at its opposite end which terminal leg has a gripping edge for edgewise biting cooperation with the wheel, said axial leg normally extending slightly axially beyond said shoulder structure with said edge being in generally radially spaced alignment with respect to said shoulder structure, said resiliently deflectable axial leg when removed from the wheel being spaced from said shoulder structure and upon pressing of said cover segment against the wheel and upon progressive camming engagement of the gripping edges against the wheel the axial leg is fulcrumed on said shoulder structure backing up said gripping edge at an area in close proximity to the area where the gripping edge is retainingly engaged against the wheel.

7. The wheel structure of claim 6 further characterized by said cover segment having a dished area with said shoulder structure being defined by said dished area on the underside of the cover segment and with said axial leg being arched and out of contact with the cover when engaged in assembly with the wheel between said shoulder structure and where said leg is bottomed against the cover segment at its axially inner end.

8. In a wheel structure, a wheel, a wheel cover segment for overlying retaining engagement on the wheel including an annular dished area defining shoulder structure on the axially inner side of the cover segment, and circumferentially spaced resiliently deflectable retaining structure carried by the cover segment including circumferentially spaced elongated resiliently deflectable axial legs with portions of the leg disposed on axially inner and on axially outer sides of the shoulder structure and with said leg having a wheel engaging edge for retaining cooperation with the wheel, said axial leg normally extending slightly axially beyond said shoulder structure with said edge being in generally radially spaced alignment with respect to said shoulder structure, said resiliently deflectable axial legs when removed from the wheel being arranged in a common circle radially spaced from said shoulder structure and upon pressing of said cover segment against the wheel and upon progressive camming engagement of the gripping edges against the wheel the axial leg is fulcrumed and arched on said shoulder structure backing up said gripping edge at an area in close proximity to the area where the gripping edge is retainingly engaged against the wheel.

9. In a wheel structure, a wheel including a cover engaging area, a wheel cover segment for overlying retained engagement on the wheel including shoulder structure, and circumferentially spaced resiliently deflectable retaining structure carried by the cover segment including circumferentially spaced elongated resiliently deflectable axial legs disposed radially between the wheel and the shoulder structure and extending axially across the shoulder structure with opposite ends of the axial leg disposed axially inwardly and outwardly of the shoulder structure which legs are disposed in a common circle having a diameter slightly at variance with said shoulder structure and the cover engaging area, said axial leg having a gripping edge for retaining cooperation with the wheel, said resiliently deflectable axial leg when removed from the wheel being spaced from said shoulder structure and upon pressing of said cover segment against the cover engaging area on the wheel and upon progressive camming engagement of the gripping edges against the cover engaging area the axial leg is fulcrumed on said shoulder structure backing up said gripping edge at an area in close proximity to the cover engaging area where the gripping edge is retainingly engaged against the wheel.

References Cited in the file of this patent
UNITED STATES PATENTS

| | | |
|---|---|---|
| 2,544,705 | Lyon | Mar. 13, 1951 |
| 2,624,628 | Lyon | Jan. 6, 1953 |
| 2,624,635 | Lyon | Jan. 6, 1953 |